(12) United States Patent
Chen (10) Patent No.: US 11,525,919 B2
(45) Date of Patent: Dec. 13, 2022

(54) VEHICLE-MOUNTED LASER VELOCITY MEASUREMENT DEVICE (71) Applicant: BEIJING HANGTIANGUANGXIN TECHNOLOGY COMPANY LIMITED, Beijing (CN)

(72) Inventor: Peng Chen, Changsha (CN)

(73) Assignee: BEIJING HANGTIANGUANGXIN TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 17/649,368

(22) Filed: Jan. 30, 2022

(65) Prior Publication Data

US 2022/0155447 A1 May 19, 2022

Related U.S. Application Data (63) Continuation-in-part of application No. PCT/CN2020/101751, filed on Jul. 14, 2020.

(30) Foreign Application Priority Data

Aug. 13, 2019 (CN) .......................... 201910742058.6

(51) Int. Cl.
*G01S 17/58* (2006.01)
*G01S 7/481* (2006.01)
*G02B 27/12* (2006.01)

(52) U.S. Cl.
CPC ............ *G01S 17/58* (2013.01); *G01S 7/4814* (2013.01); *G01S 7/4816* (2013.01); *G02B 27/126* (2013.01)

(58) Field of Classification Search
CPC ...... G01S 17/58; G01S 7/4814; G01S 7/4816; G02B 27/126
See application file for complete search history.

(56) References Cited

FOREIGN PATENT DOCUMENTS

CN 106020681 A 5/2018
CN 108592873 A 9/2018
(Continued)

OTHER PUBLICATIONS

NPL1 Qi Wang, Chunfeng Gao, Jian Zhou, Guo Wei, Xiaoming Nie, and Xingwu Long, "Two-dimensional laser Doppler velocimeter and its integrated navigation with a strapdown inertial navigation system," Appl. Opt. 57, 3334-3339 (2018) (Year: 2018).*

(Continued)

*Primary Examiner* — Luke D Ratcliffe
*Assistant Examiner* — Sanjida Naser
(74) *Attorney, Agent, or Firm* — Metis IP LLC (57) ABSTRACT

A vehicle-mounted dual-oblique asymmetric laser velocity measurement device is provided. A small-angle splitting prism (9) is installed on a laser path where the laser beam of the reference-beam LDV probe is incident onto a driving surface. The laser beam is split by the small-angle splitting prism (9) into two emergent beams having an included angle α for incidence onto the driving surface. Two ground-scattered light beams returning along the original direction of the two emergent beams are used as signal light together. Reference light is mixed with the signal light on a photosensitive surface of a photodetector of the reference beam LDV probe. The photodetector mixes the reference light and the signal light to form Doppler signals for transmission to a signal processing unit (10). The signal processing unit (10) extracts the Doppler frequencies corresponding to the two emergent beams separately, to implement velocity calculation.

8 Claims, 7 Drawing Sheets

(56) References Cited

FOREIGN PATENT DOCUMENTS

| | | |
|---|---|---|
| CN | 109407110 A | 3/2019 |
| CN | 110398749 A | 11/2019 |
| CN | 211043674 U | 7/2020 |
| JP | H05312952 A | 11/1993 |
| WO | WO-2010058322 A1 * | 5/2010 ............. G01P 3/366 |

OTHER PUBLICATIONS

Periscope prism vs mirror (Year: 2021).*
International Search Report in PCT/CN2020/101751 dated Sep. 30, 2020, 8 pages.
Written Opinion in PCT/CN2020,101751 dated Sep. 30, 2020, 7 pages.
Zhou Jian et al., Laser Doppler Velocimeter Based on Janus Configuration, Journal of Optoelectronics • Laser, 22(2): 266-271, 2011.

* cited by examiner

VEHICLE-MOUNTED LASER VELOCITY MEASUREMENT DEVICE

CROSS-REFERENCE TO RELATED APPLICATIONS

This application is a continuation-in-part of International Application No. PCT/CN2020/101751, filed on Jul. 14, 2020, which claims priority to Chinese Patent Application No. 201910742058.6, filed on Aug. 13, 2019, the entire contents of which are hereby incorporated by reference.

TECHNICAL FIELD

The present disclosure generally relates to the field of laser velocity measurement technology, and in particular to a vehicle-mounted laser velocity measurement device.

BACKGROUND

In a conventional vehicle-mounted laser velocity measurement device in a reference beam mode, the entire laser velocity measurement device is fixedly attached to a carrier (e.g., a vehicle) to measure a driving velocity of the vehicle relative to the ground. Laser beams from a laser is divided by a beam splitter into reference light and scattered light incident on a surface for driving (e.g., ground surface). The scattered light returning in the original direction is received by a photodetector as signal light. Frequencies of the reference light and the signal light are mixed on a photosensitive surface of the photodetector. A voltage signal output from the photodetector includes differential frequencies (i.e., Doppler frequency) of the two light, and the velocity of the vehicle can be calculated by detecting the Doppler frequencies.

The velocity to be measured is closely related to an inclination angle of light relative to the ground. In the driving process, a vehicle is often bumpy, causing the inclination angle changed, which leads to inaccurate velocity measurement.

Therefore, it is desirable to provide a velocity measurement device and method that can be unaffected by the emergent inclination angle to overcome the above problem.

SUMMARY

According to an aspect of the present disclosure, a vehicle-mounted dual-oblique asymmetric laser velocity measurement device which is mounted on a carrier and moves with the carrier to determine a velocity of the carrier relative to a driving surface is provided. The vehicle-mounted dual-oblique asymmetric laser velocity measurement device includes a reference-beam laser Doppler velocimetry (LDV) probe and a signal processing unit, wherein the reference-beam LDV probe makes a laser beam incident onto the driving surface and obtains a scattered light to form a detection signal, the detection signal output from the reference-beam LDV probe is transmitted to the signal processing unit, and the signal processing unit performs velocity calculation. A small-angle splitting prism is installed on a laser path where the laser beam of the reference-beam LDV probe is incident onto the driving surface.

The reference-beam LDV probe comprises a laser, a compressed collimating lens group, a beam splitter, an attenuator, a holophote, a filter, a small aperture diaphragm, a photodetector, and a small-angle splitting prism. a laser beam emitted by the laser is compressed and collimated by the compressed collimating lens group and then incident on the beam splitter; the beam splitter divides the laser beam into two laser beams in equal intensity, one of which is incident on the holophote after penetrating through the attenuator, is reflected to the attenuator again for attenuation, passes through the beam splitter, the filter, and the small aperture diaphragm, and is received by the photodetector as reference light, and the other of which is divided by the small-angle splitting prism into two emergent beams with an angle α, which are incident on the driving surface; the two emergent beams are 1# emergent beam and 2# emergent beam, respectively; two ground-scattered beams returned along original directions of the two emergent beams are used together as signal light, wherein the signal light comprises the ground-scattered beam returned along the original direction of the 1# emergent beam and the ground-scattered beam returned along the original direction of the 2# emergent beam; the signal light passes through the small-angle splitting prism, the beam splitter, the filter, and the small aperture, and is received by the photodetector; and the photodetector obtains Doppler signals formed by mixing frequencies of the reference light and the signal light on a photosensitive surface of the photodetector.

The frequencies of the ground-scattered light returned along the original direction of the 1# emergent beam and the reference light are mixed on the photosensitive surface of the photodetector to form a Doppler signal, and the frequencies of the ground-scattered light returned along the original direction of the 2# emergent beam and the reference light are mixed on the photosensitive surface of the photodetector to form a Doppler signal; the Doppler signals detected by the photodetector comprise two different Doppler frequencies; the Doppler signals detected by the photodetector are input to the signal processing unit; and the signal processing unit performs velocity calculation by extracting the Doppler frequency $f_{D1}$ corresponding to the 1# emergent beam and the Doppler frequency $f_{D2}$ corresponding to the 2# emergent beam.

The signal processing unit performs the velocity calculation as follows: the Doppler frequency $f_{D1}$ corresponding to the 1# emergent beam and the Doppler frequency $f_{D2}$ corresponding to the 2# emergent beam are represented by the following Equations:

$$f_{D1} = \frac{2v\cos\theta}{\lambda}$$

$$f_{D2} = \frac{2v\cos(\theta + \alpha)}{\lambda}$$

wherein α denotes an angle between the 1# emergent beam and the 2# emergent beam and the size of the angle is determined by the small-angle splitting prism; θ denotes an emergent inclination angle of the 1# emergent beam; (θ+α) denotes an emergent inclination angle of the 2# emergent beam; and based on the above Equations, the following Equation is determined:

$$v = \frac{\lambda}{2\sin\alpha} \sqrt{f_{D1}^2 + f_{D2}^2 - 2f_{D1}f_{D2}\cos\alpha}$$

$$\theta = \arctan\frac{f_{D1}\cos\alpha - f_{D2}}{f_{D1}\sin\alpha}$$

calculating the velocity v of the vehicle in conjunction with the angle α between the 1# emergent beam and the 2# emergent beam by detecting the Doppler frequency $f_{D1}$ corresponding to the 1# emergent beam and the Doppler frequency $f_{D2}$ corresponding to the 2# emergent beam.

After the Doppler signals detected by the photodetector are input to the signal processing unit, an autocorrelation spectrum of the Doppler signal is first obtained by autocorrelation spectrum analysis, a maximum peak is searched, the first Doppler frequency is obtained based on a position of the maximum peak; the maximum peak and neighboring spectrum are filtered out from the autocorrelation spectrum and a maximum peak is searched from the filtered autocorrelation spectrum, the second Doppler frequency is obtained based on a position of the maximum peak searched again; and acceleration discrimination is performed based on the two Doppler frequencies to determine a correspondence relationship between the two Doppler frequencies and the two emergent beams and to obtain the Doppler frequency $f_{D1}$ corresponding to the 1# emergent beam and the Doppler frequency $f_{D2}$ corresponding to the 2# emergent beam.

The small-angle splitting prism comprises two prisms glued together.

Glued surfaces between the two prisms of the small-angle splitting prism are coated with a splitting film having a transmissivity to reflectivity ratio of 1:1, and the small-angle splitting prisms are coated with a transmittance-enhancing film on both incident and emergent surfaces.

According to another aspect of the present disclosure, a reference-beam laser Doppler velocimeter (LDV) probe is provided. The reference-beam laser Doppler velocimeter (LDV) probe is mounted on a carrier and moves with the carrier, wherein a small-angle splitting prism is installed on a laser path where the laser beam of the reference-beam LDV probe is incident onto the driving surface.

The reference-beam LDV probe comprises a laser, a compressed collimating lens group, a beam splitter, an attenuator, a holophote, a filter, a small aperture diaphragm, a photodetector, and a small-angle splitting prism. a laser beam emitted by the laser is compressed and collimated by the compressed collimating lens group and then incident on the beam splitter; the beam splitter divides the laser beam into two laser beams in equal intensity, one of which is incident on the holophote after penetrating through the attenuator, is reflected to the attenuator again for attenuation, passes through the beam splitter, the filter, and the small aperture diaphragm, and is received by the photodetector as reference light, and the other of which is divided by the small-angle splitting prism into two emergent beams with an angle α, which are incident on the driving surface; the two emergent beams are 1# emergent beam and 2# emergent beam, respectively; two ground-scattered beams returned along original directions of the two emergent beams are used together as signal light, wherein the signal light comprises the ground-scattered beam returned along the original direction of the 1# emergent beam and the ground-scattered beam returned along the original direction of the 2# emergent beam; the signal light passes through the small-angle splitting prism, the beam splitter, the filter, and the small aperture, and is received by the photodetector; and the photodetector obtains Doppler signals formed by mixing frequencies of the reference light and the signal light on a photosensitive surface of the photodetector.

The small-angle splitting prism comprises two prisms glued together; glued surfaces between the two prisms of the small-angle splitting prism are coated with a splitting film with a transmissivity to reflectivity ratio of 1:1; and the small-angle splitting prisms are coated with a transmittance-enhancing film on both incident and emergent surfaces.

DETAILED DESCRIPTION

In order to illustrate the technical approach of the embodiments of the present disclosure more clearly, the following is a brief description of the attached drawings required for use in the description of the embodiments. It is apparent that the attached drawings in the following description are only some examples or embodiments of the present disclosure, and it is possible for the people of skill in the art to apply the present disclosure to other similar scenarios based on these drawings without creative effort. Unless obvious from the linguistic context or otherwise noted, the same symbols in the figures represent the same structure or operation.

It should be understood that the terms "system," "device," "unit," and/or "module" as used herein is a way to distinguish different components, elements, parts, sections, or assemblies at different levels. However, if other words may serve the same purpose, the words described may be replaced by other expressions.

As shown in this description and the claims, unless the context clearly suggests an exception, the words "one," "a," "a," and/or the word "the" does not refer specifically to the singular, but may also include the plural. In general, the terms "includes" and "comprises" suggest only the inclusion of clearly identified steps and elements that do not constitute an exclusive list, and the method or device may also contain other steps or elements.

Flow charts are used in this description to illustrate the operations performed by the system according to embodiments of this description. It should be understood that the preceding or following operations are not necessarily performed in precise order. On the contrary, the individual steps may be processed in reverse order or simultaneously. Also, other operations may be added to these processes or one step or several steps of operations may be removed from these processes.

The present disclosure provides a variety of vehicle-mounted laser velocity measurement devices (also referred to as device) that can be mounted on a carrier (e.g., a vehicle) to move with the carrier and measure a velocity of a carrier relative to a surface that the carrier is driving on.

Figure 1:
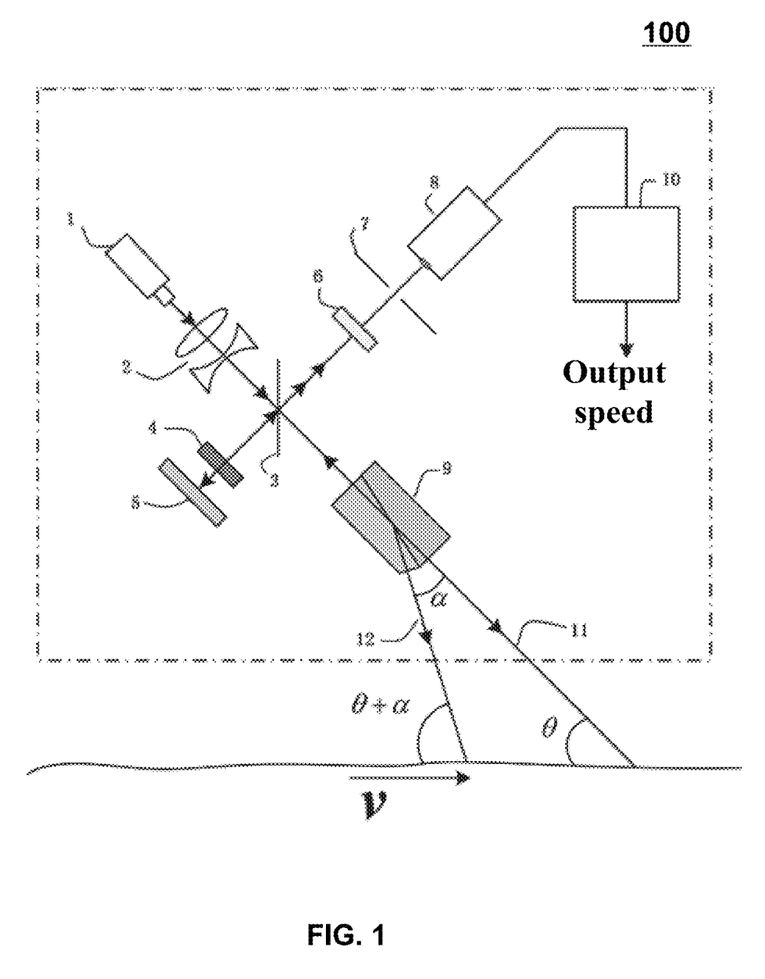
FIG. 1 is a structural diagram of an overall optical path according to some embodiments of the present disclosure.

FIG. 1 is a structural diagram of an overall optical path according to some embodiments of the present disclosure.

In some embodiments, the vehicle-mounted laser velocity measurement device may include the vehicle-mounted dual-oblique asymmetric laser velocity measurement device 100 (or referred to as device 100 in short) shown in FIG. 1. The device 100 may include a reference-beam laser Doppler velocimetry (LDV) probe and a signal processing unit 10. The reference-beam LDV probe may include a laser 1, a compressed collimating component 2, a beam splitter 3, an attenuator 4, a holophote 5, a filter 6, a small aperture diaphragm 7, a photodetector 8, and a small-angle splitting prism 9.

A laser is a device for emitting a laser beam. In some embodiments, the laser 1 may include a solid laser (e.g., a single longitudinal mode solid-state laser), a gas laser, a liquid laser, a semiconductor laser, a free electron laser, or the like. In some embodiments, the laser 1 may be a single longitudinal mode solid-state laser. In some embodiments, the laser 1 may emit a laser beam for velocity measurement in response to a user's need. In some embodiments, the laser 1 may automatically perform velocity measurement. The laser beam emitted by the laser 1 enters the compressed collimating component 2.

A compressed collimating component is a component for converting a light source having a divergence angle into parallel light. In some embodiments, the compression collimating component 2 may be a lens group. In some embodiments, the compression collimating component 2 may be a compression collimating lens group. In some embodiments, the compression collimating component 2 may include a spherical lens, an aspherical lens, and a cylindrical lens. In some embodiments, the compressed collimating component 2 may receive a laser beam emitted by the laser 1, compress and convert the laser beam into a parallel beam column, and further make the parallel beam column incident onto the beam splitter 3.

A beam splitter is a component for splitting the incident beam into transmission light and reflected light with a certain light intensity ratio. In some embodiments, the beam splitter 3 may split the incident light into a first laser beam and a second laser beam with a light intensity ratio of 1:1. In some embodiments, the beam splitter 3 may not make a change to the optical path when light beam is incident at a certain angle to the beam splitter 3. In some embodiments, the beam splitter 3 may be coated glass.

An attenuator is a sheet component for attenuating light intensity. In some embodiments, the attenuator 4 may receive the first laser beam as described above and attenuate the light intensity of the first laser beam when the first laser beam passes through the attenuator 4. In some embodiments, the attenuator 4 may receive reflected light from the holophote 5 and attenuate it again.

A holophote is a component for adjusting a direction of light beam. In some embodiments, the holophote 5 may receive the light beam after attenuation of the attenuator 4 and reflect it back to the attenuator 4 in the opposite direction of the direction of incidence.

A filter is a component for filtering the incident beam. In some embodiments, the filter 6 may receive the light beam from the beam splitter 3 and output the filtered beam to the small aperture diaphragm 7 after filtering the light beam.

A small aperture diaphragm is a barrier with a light-through aperture. In some embodiments, the small aperture diaphragm 7 may include a discrete small aperture diaphragm or an integrated small aperture diaphragm. Light may be restricted via the small aperture diaphragm 7. In some embodiments, the small aperture diaphragm 7 may output reference light and the outputted reference light may be received by the photodetector 8. In some embodiments, the small aperture diaphragm 7 may output signal light and the outputted signal light may be received by the photodetector 8.

A photodetector is a component for converting an optical signal into an electrical signal. In some embodiments, the photodetector 8 may include a photosensitive surface configured to mix frequencies of the reference light and signal light. In some embodiments, the photodetector 8 may generate a Doppler signal and input it to the signal processing unit 10.

A small-angle splitting prism is a component for splitting a light beam into two beams with a small angle. In some embodiments, the small angle refers to an angle of less than 60 degrees. In some embodiments, the small angle refers to an angle of less than 15 degrees. In some embodiments, the small-angle splitting prism 9 may be a coated prism. In some embodiments, the small angle splitting prism 9 may split the second laser beam output from the beam splitter 3 into a first emergent beam 11, a second emergent beam 12, wherein there is an angle between the emergent light 11 and the emergent light 12. In some embodiments, the small-angle splitting prism 9 is made by gluing together two prisms. The glued surfaces of the two prisms of the small-angle splitting prism 9 are coated with a splitting film having a transmissivity to reflectivity ratio of 1:1. In some embodiments, the incident surface and the emergent surface of the small-angle splitting prism 9 are coated with a transmittance-enhancing film.

A signal processing unit is a component for processing a signal. In some embodiments, based on the Doppler signal input from the photodetector 8, the signal processing unit 10 may extract a corresponding Doppler frequency and thus determine the velocity of the carrier. In some embodiments, the signal processing unit 10 may be a dual spectral peak processing unit for the precise extraction of two Doppler frequencies.

As shown in FIG. 1, the overall optical path structure is as follows. A laser beam emitted from the laser 1 is compressed and collimated by the compressed collimating component 2, and then incident to the beam splitter 3. The beam splitter 3 divides the laser beam into a first laser beam and a second laser beam with equal intensity, The first laser beam is incident through the attenuator 4 to the holophote 5 and then reflected to the attenuator 4 again for attenuation, and is received by the photodetector 8 as a reference light after passing through the beam splitter 3, the filter 6, and the small aperture diaphragm 7. The second laser beam is divided by the small angle splitting prism 9 into two emergent beams with an angle α, which are incident to a driving surface, and the two emergent beams are the first emergent beam 11 (also referred to as 1# emergent beam) and the second emergent beam 12 (also referred to as 2# emergent beam). Two ground-scattered light returned along the original directions of the two emergent beams are together used as signal light. The signal light includes the scattered light returned along the original direction of the first emergent beam and the scattered light returning along the original direction of the second emergent beam. The signal light is received by the photodetector 8 after passing through the small angle beam splitting prism 9, beam splitter 3, filter 6 and small aperture diaphragm 7. Frequencies of the reference light and the signal light are mixed on the photosensitive surface of the photodetector 8, and the photodetector 8 collects the reference light and the signal light to form Doppler signals. The Doppler signals are transmitted to the signal processing unit 10 to extract the corresponding Doppler frequencies. In some embodiments, frequencies of the scattered light returned along the original direction of the first emergent beam and the reference light are mixed on the photosensitive surface of the photodetector 8 to form a Doppler signal (first Doppler signal). Frequencies of the scattered light returned along the original direction of the second emergent beam and the reference light are mixed on the photosensitive surface of the photodetector 8 to form a Doppler signal (second Doppler signal). Each of the first and second Doppler signals include a corresponding Doppler frequency. For example, the first Doppler signal includes the first Doppler frequency, and the second Doppler signal includes the second Doppler frequency.

The vehicle-mounted dual-oblique asymmetric laser velocity measurement device uses two oblique asymmetric laser beams as the emergent beams (i.e., 1# emergent beam and 2# emergent beam), and determine the velocity of the vehicle relative to the driving surface according to the Doppler frequencies corresponding to the two oblique asymmetric laser beams and the angle between them.

In some embodiments, Doppler frequencies corresponding to two emergent beams can be measured simultaneously, avoiding problems such as inaccurate velocimetry or the necessity of correcting Doppler frequencies due to the inability to obtain two Doppler frequencies in real time, and solving the problem that the installation angle is difficult to calibrate during the measurement and the vehicle bumps affect the measurement accuracy. The device in some embodiments has a simple structure, low cost, and high reliability of the measured velocity. Non-contact measurement of velocity of moving objects can be achieved.

Figure 2:
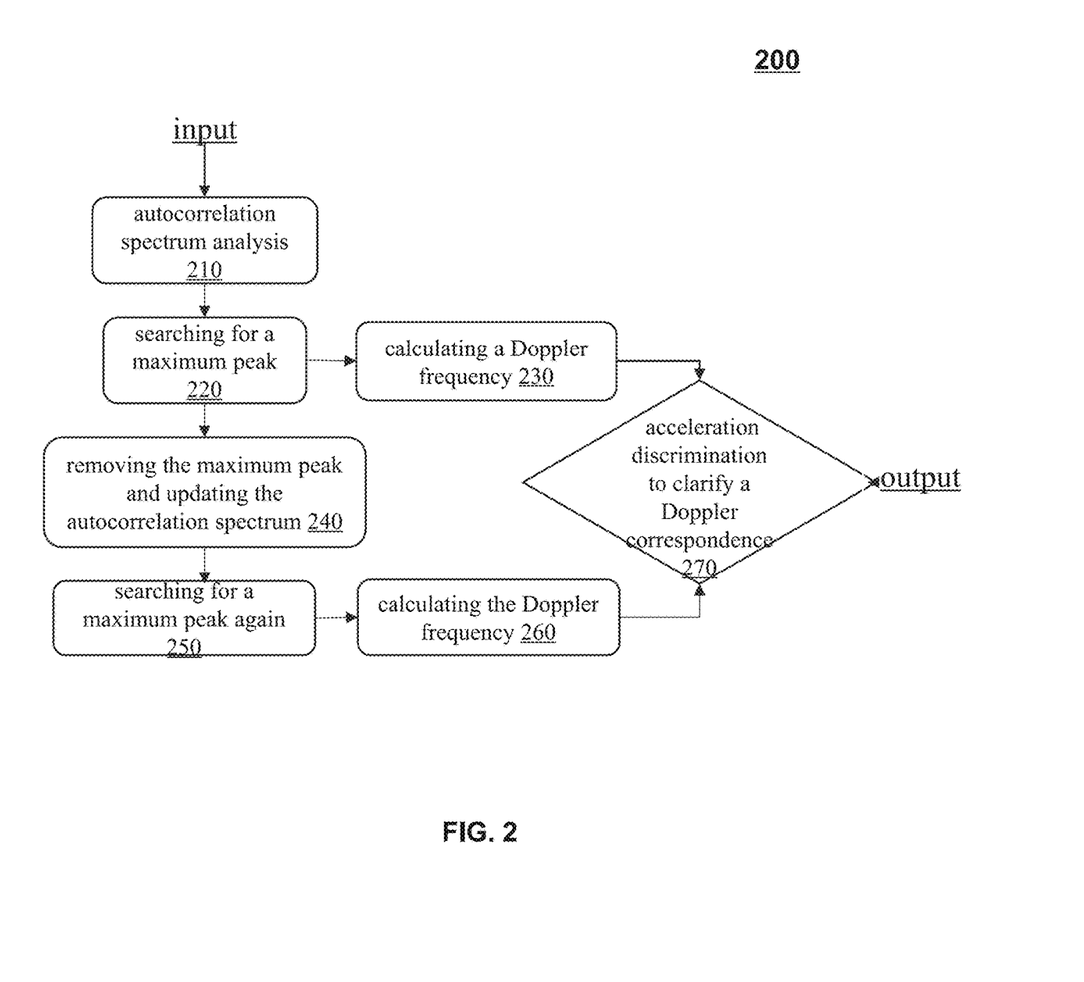
FIG. 2 is a flow diagram of a velocity calculation process based on a Doppler signal according to some embodiments of the present disclosure.

FIG. 2 is a flow diagram of a velocity calculation process based on a Doppler signal according to some embodiments of the present disclosure. The process 200 described in FIG. 2 may be performed by the signal processing unit 10 shown in FIG. 1.

In some embodiments, the signal processing unit 10 may include a dual spectral peak processing unit whose main function is to precisely extract two Doppler frequencies based on a method of Fast Fourier Transform (FFT) spectral analysis. The specific steps for extracting the two Doppler frequencies are as follows:

Step 210, performing autocorrelation spectrum analysis.

The signal processing unit 10 may obtain the Doppler signals detected by the photodetector 8. The signal processing unit 10 may obtain an autocorrelation spectrum of the Doppler signals based on the autocorrelation spectrum analysis of the Doppler signals. The autocorrelation spectrum may be a function curve obtained by performing an autocorrelation function calculation on the Doppler signals.

Step 220, searching for a maximum peak.

The maximum peak, i.e., an extreme value point, is searched on the autocorrelation spectrum as a first maximum peak and recorded.

Step 230, calculating a Doppler frequency.

A first Doppler frequency is obtained based on the first maximum peak (e.g., a position of the first maximum peak).

Step 240, removing the maximum peak and updating the autocorrelation spectrum.

The maximum peak (i.e., the first maximum peak) and neighboring spectrum are filtered out from the autocorrelation spectrum and a maximum peak is searched from the filtered autocorrelation spectrum.

Step 250, searching for a maximum peak again.

A maximum peak (i.e., the maximum value point) is searched on the updated autocorrelation spectrum as the second largest peak and record it.

Step 260, calculating the Doppler frequency.

A second Doppler frequency is obtained based on this second maximum peak.

Step 270, performing acceleration discrimination to clarify a Doppler correspondence relationship.

The acceleration discrimination is performed based on the first Doppler frequency and the second Doppler frequency to clarify the Doppler correspondence, i.e., the correspondence relationship between the two Doppler frequencies and the two emergent beams. Thus, the first and second Doppler frequencies $f_{D1}$ and $f_{D2}$ are output.

In some embodiments, the velocity of a carrier can be calculated from the two Doppler frequencies.

The velocity of the carrier can be determined by the following equation (1):

$$v = \frac{\lambda}{2\sin\alpha}\sqrt{f_{D1}^2 + f_{D2}^2 - 2f_{D1}f_{D2}\cos\alpha} \quad (1)$$

wherein: $\alpha$ denotes an angle between the first emergent beam and the second emergent beam, and its value is determined by the small-angle splitting prism; $\lambda$ is a preset known coefficient.

The equation (1) is determined based on the following equations (2) and (3) representing the first Doppler frequency $f_{D1}$ corresponding to the first emergent beam and the second Doppler frequency $f_{D2}$ corresponding to the second emergent beam:

$$f_{D1} = \frac{2v\cos\theta}{\lambda} \quad (2)$$

$$f_{D2} = \frac{2v\cos(\theta + \alpha)}{\lambda} \quad (3)$$

By detecting the first Doppler frequency $f_{D1}$ corresponding to the first emergent beam and the second Doppler frequency $f_{D2}$ corresponding to the second emergent beam, the velocity of the carrier can be deduced by combining the known angle $\alpha$ between the two emergent beams.

In some embodiments, two laser beams are emitted from a small angle-splitting prism and are incident obliquely on the ground, and the velocity of the vehicle can be deduced from the corresponding Doppler frequencies of the two beams and the angle of the two beams. The velocity of the carrier is only related to the angle $\alpha$ of the two emergent beams and is irrelevant to the inclination angle of the two emergent beams, which eliminates the influence of the change of the inclination angle due to bumps during movement on the accuracy of the velocity measurement.

In some embodiments according to the corresponding Doppler frequencies of the two emergent beams and the angle of the two emergent beams, the inclination angle $\theta$ and $\theta+\alpha$ of the two emergent beams can be measured in real time, i.e., the change of the pitch angle of the carrier during movement can be calculated. Specifically, based on the above equations (1)-(3), the following equations can be derived:

$$\theta = \arctan\frac{f_{D1}\cos\alpha - f_{D2}}{f_{D1}\sin\alpha} \quad (4)$$

wherein: θ denotes the inclination angle of the first emergent beam; θ+α denotes the inclination angle of the second emergent beam.

Figure 3:
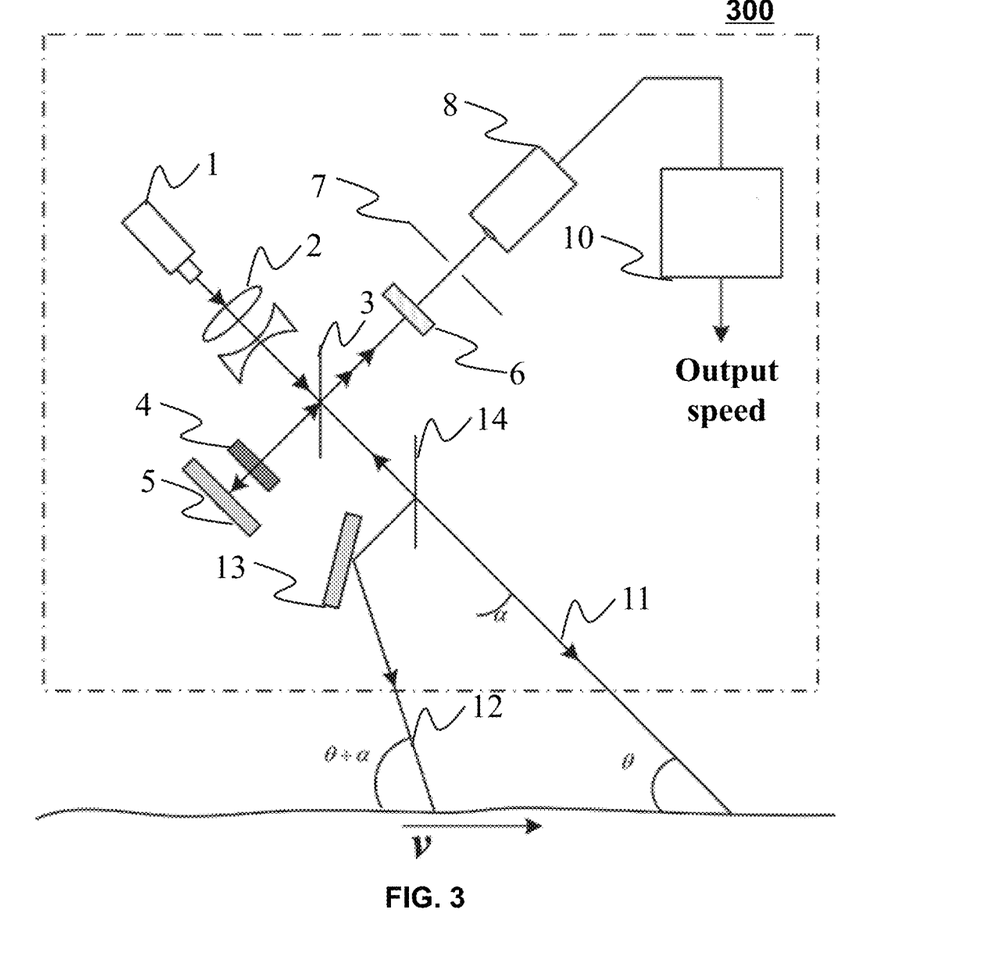
FIG. 3 is a structural diagram of an overall optical path according to some other embodiments of the present disclosure.

FIG. 3 is a structural diagram of an overall optical path according to some other embodiments of the present disclosure.

As shown in FIG. 3, in the overall optical path structure in some other embodiments, the vehicle velocity measurement can be performed by replacing the small angle splitting prism 9 of FIG. 1 with a beam splitter 14 and a holophote 13. The vehicle-mounted laser velocity measurement device for 300 may include a reference-beam laser Doppler velocimetry (LDV) probe and a signal processing unit 10. The reference-beam LDV probe may include a laser 1, a compressed collimating component 2, a beam splitter 3, an attenuator 4, a holophote 5, a filter 6, a small-aperture diaphragm 7, a photodetector 8, a holophote 13 and a beam splitter 14. The beam splitter 14 may receive the transmitted light from the beam splitter 3 and further divide this transmitted light into reflected light and transmitted light with equal intensity. The transmitted light (i.e., the first emergent beam 11) is in direct contact with the relatively moving ground, forming an angle θ as in FIG. 3. The reflected light is emitted to holophote 13 and further reflected by the holophote 13 to form a second emergent beam 12 which is emitted to the relatively moving ground. The process of velocity calculation in FIG. 2 is achieved by adjusting positions of the beam splitter 14 and the holophote 13 and selecting the physical properties of the lenses of the beam splitter 14 and the holophote 13 so that there is an angle α between the first emergent beam 11 and the second emergent beam 12. Description of the rest of the optical path structure can be seen in FIG. 1 and its related description, which is not repeated here.

In some embodiments, the beam splitter 14 and the holophote 13 are used to replace the small-angle splitting prism, enabling simultaneous measurement of the Doppler frequencies corresponding to the two emergent beams, so that the velocity of the carrier relative to the driving surface can be accurately measured, avoiding problems such as inaccurate velocimetry or the necessity to correct the Doppler frequencies due to the inability to obtain the two Doppler frequencies in real time.

Figure 4:
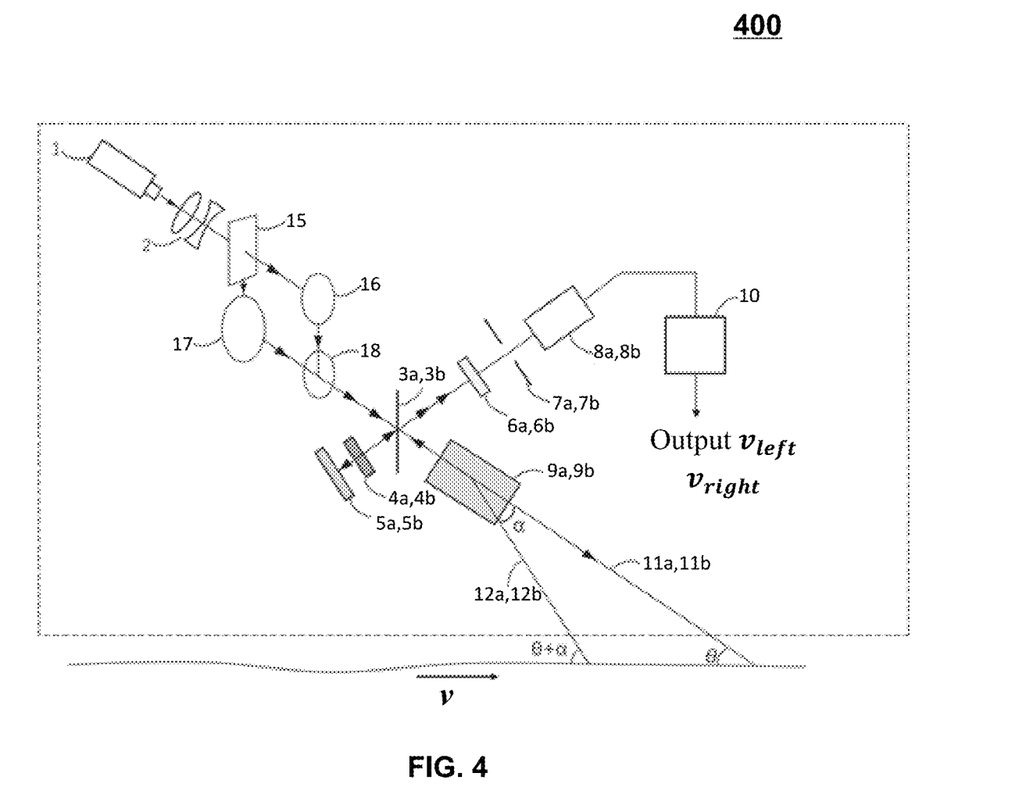
FIG. 4 is a side-view structural diagram of an overall optical path structure according to some other embodiments of the present disclosure.
Figure 5:
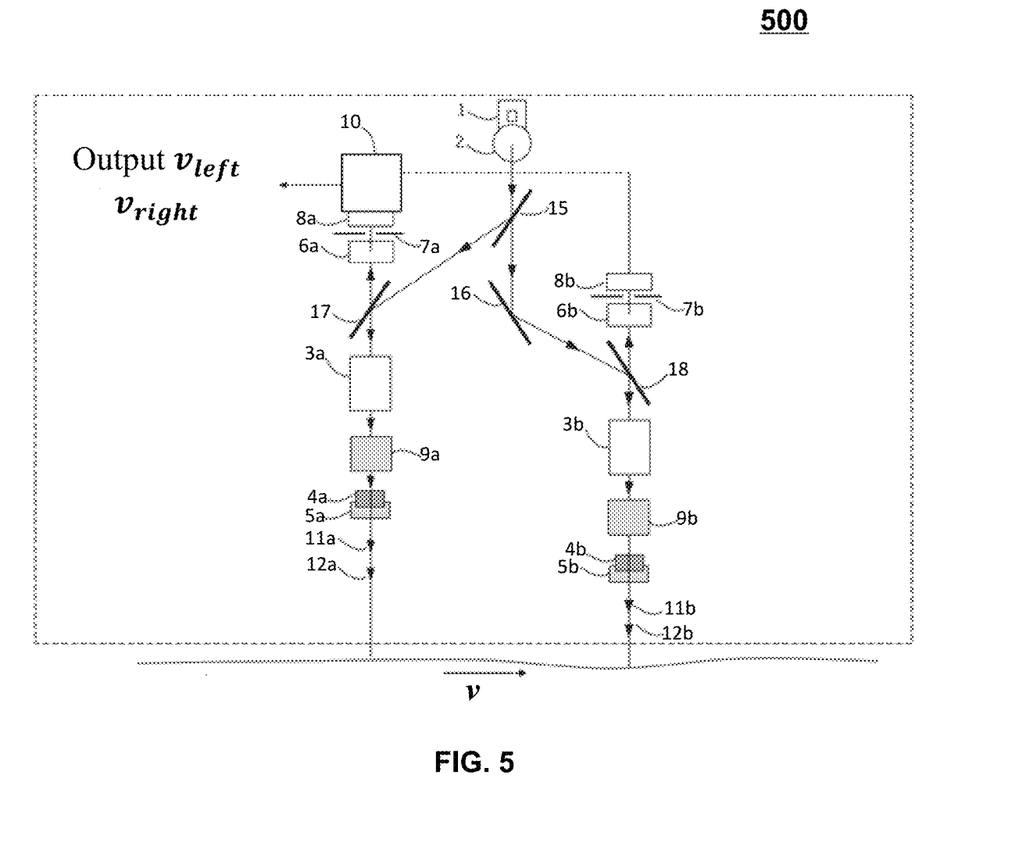
FIG. 5 is a front-view structural diagram of the overall optical path structure according to some other embodiments of the present disclosure.

FIG. 4 is a side-view structural diagram of an overall optical path structure according to some other embodiments of the present disclosure. FIG. 5 is a front-view structural diagram of the overall optical path structure according to some other embodiments of the present disclosure.

As shown in FIG. 4 and FIG. 5, the vehicle-mounted laser velocity measurement device 400 may include a laser 1, a compressed collimating component 2, a first beam splitter 15, a first reflector 16, a second reflector 17, a second beam splitter 3a, a first attenuator 4a, a first holophote 5a, a first filter 6a, a first small-aperture diaphragm 7a, a first photodetector 8a, a first small-angle splitting prism 9a, a signal processing unit 10, a third reflector 18, a third beam splitter 3b, a second attenuator 4b, a second holophote 5b, a second filter 6b, a second small-aperture diaphragm 7b, a second photodetector 8b, and a second small-angle splitting prism 9b.

The first beam splitter mirror 15 may be configured to split first detection light (e.g., laser emitted by the laser 1) from the compressed collimating component 2 into detection light in a direction of transmission (e.g., a direction of the original light) and in a direction of reflection (e.g., a direction perpendicular to the direction of the original light) for subsequent processing based on the method in the present disclosure.

The first reflector 16 may be configured to reflect the transmitted beam into a beam perpendicular to that direction of the transmitted beam. In some embodiments, the second reflector 17 and the third reflector 18 may be installed on each side of the device. For example, the second reflector 17 may be installed near the left side of a vehicle, and the third reflector 18 may be installed near the right side of the vehicle.

In some embodiments, the first beam splitter 15 receives light beam from the compressed collimating component 2 and divides the light beam into a first reflected light and a first transmitted light. The first reflector 16 receives the first transmitted light and reflects it to the third reflector 18. The third reflector 18 reflects the first transmitted light to the third beam splitter 3b. The second reflector 17 receives the first reflected light and reflects it to the second beam splitter 3a, after which the optical path is similar to that of FIG. 1. The first transmitted light is divided by the second beam splitter 3a into two beams with equal intensity, one of which passes in turn through the first attenuator 4a, the first holophote 5a, the first filter 6a, the first small-aperture diaphragm 7a, the first photodetector 8a, and finally as reference light incident into the signal processing unit 10; the other of which is divided into two beams 11a, 12a by passing through the first small-angle splitting prism 9a. Two ground scattered light beams returned along the original direction of the two beams 11a, 12a are together used as signal light, which in turn pass through the first filter 6a, the first small aperture diaphragm 7a, the first photodetector 8a. Finally, a set of Doppler signals based on the reference light and the signal light is transmitted to the signal processing unit 10. The first reflected light is divided by the third beam splitter 3b into two beams with equal intensity, one of which passes in turn through the second attenuator 4b, the second holophote 5b, the second filter 6b, the second small aperture diaphragm 7b, the second photodetector 8b, and is finally as reference light incident into the signal processing unit 10; the other of which is divided into two beams 11b, 12b by passing through the second small-angle splitting prism 9b. Two ground scattered light beams returned along the original direction of the two beams 11b, 12b are used as signal light, which in turn pass through the second filter 6b, the second small aperture diaphragm 7b, the second photodetector 8b. Finally, the other set of Doppler signals based on the reference light and the signal light are transmitted to the signal processing unit 10. Thus, the signal processing unit 10 receives two sets of Doppler signals.

In some embodiments, two sets of Doppler signals may be measured simultaneously and the corresponding two velocities (e.g., the velocities of the left and right sides of the vehicle (e.g., the velocities of left tyres and right tyres) relative to driving surface) may be calculated based on the two sets of Doppler signals. The calculation method is similar to the method shown in FIG. 2. The signal processing unit 10 may obtain the two sets of Doppler signals detected by the photodetectors 8a and 8b, respectively, and determine the Doppler frequencies corresponding to the emergent beams 11a and 12a and the Doppler frequencies corresponding to the emergent beams 11b and 12b. According to the equation (1), the velocities corresponding to the two pairs of emergent beams, for example, the velocity corresponding to the left side of the vehicle and the velocity corresponding to the right side of the vehicle, may be determined.

By setting an additional beam splitter and three reflectors behind the compressed collimating component 2, and by setting beam splitters, attenuators, holophotes, and small-angle splitting prisms on both sides of the device 400, the collimated laser beam can be split into two beams and the velocities on both sides of carrier (e.g., the driving velocities on the left and right sides of the vehicle during driving) can be accurately measured. Based on the velocities on both sides of the carrier, angular velocity, steering angle and lateral deflection of the carrier during cornering may be determined.

Figure 6:
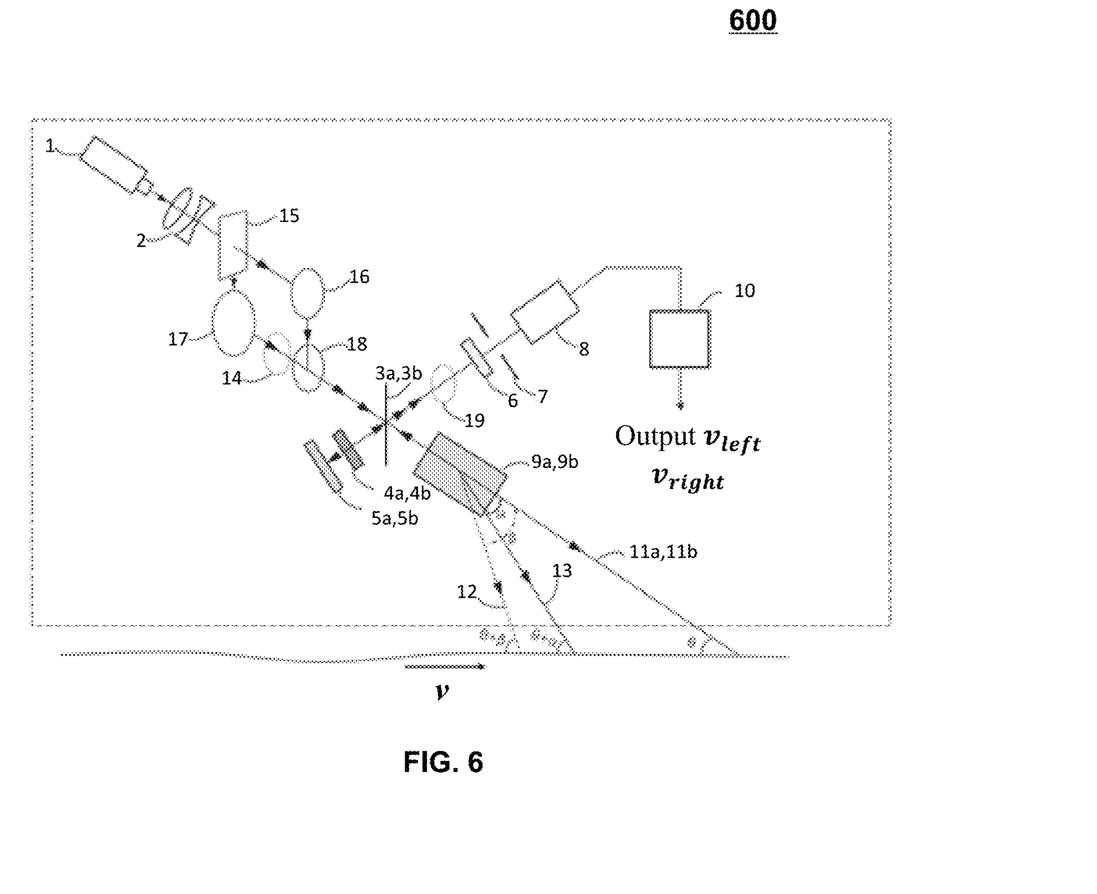
FIG. 6 is a side-view structural diagram of the overall light path according to some other embodiments of the present disclosure.
Figure 7:
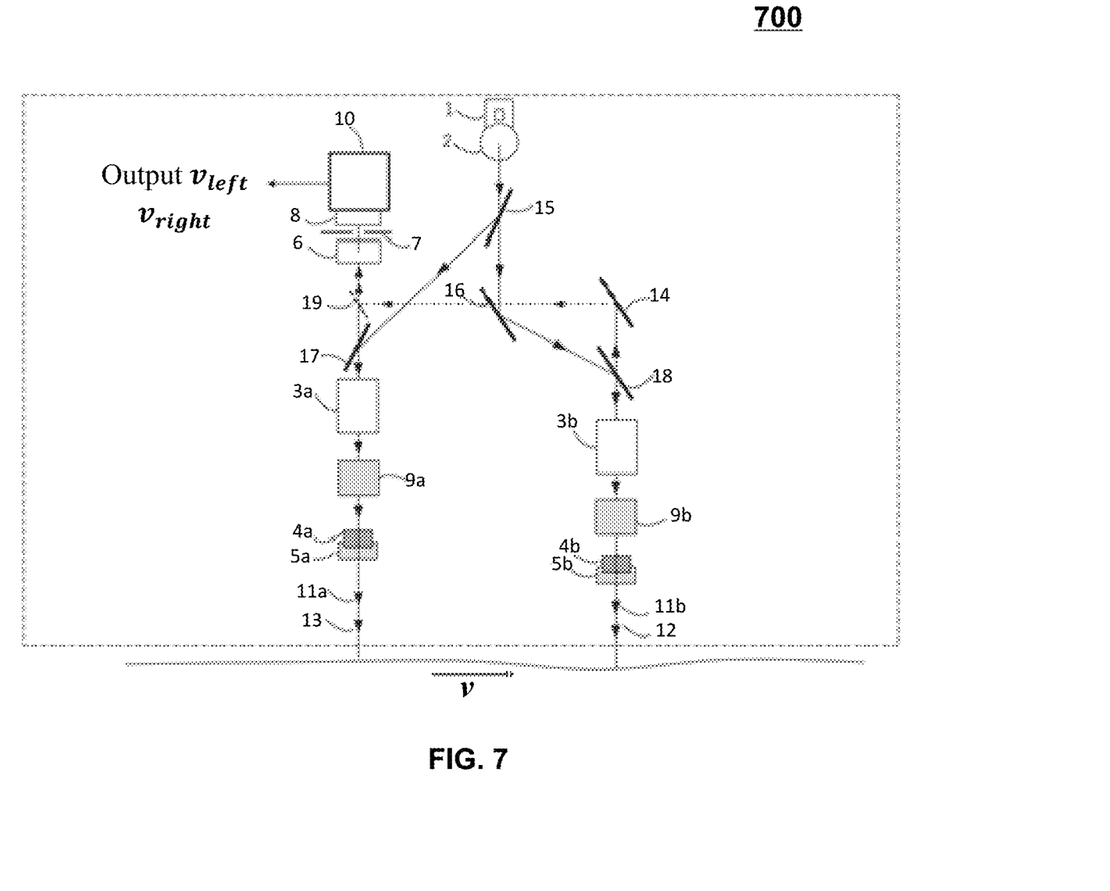
FIG. 7 is a front-view structural diagram of the overall light path according to some other embodiments of the present disclosure.

FIG. 6 is a side-view structural diagram of the overall light path according to some other embodiments of the present disclosure. FIG. 7 is a front-view structural diagram of the overall light path according to some other embodiments of the present disclosure.

As shown in FIGS. 6 and 7, a vehicle-mounted laser velocity measurement device 600 may include: a laser 1, a compressed collimating component 2, a first beam splitter 15, a first reflector 16, a second reflector 17, a second beam splitter 3a, a first attenuator 4a, a first holophote 5a, a filter 6, a small-aperture diaphragm 7, a photodetector 8, a first small-angle splitting prism 9a, a signal processing unit 10, a third reflector 18, a fourth reflector 14, a third beam splitter 3b, a fifth reflector 19, and a second small-angle splitting prism 9b.

The fourth reflector 14 and the fifth reflector 19 may be used to reflect the signal light returned by the small-angle splitting prism 9b into an optical path capable of entering the photodetector 8.

In some embodiments, the first beam splitter 15 receives the light beam from the compressed collimating component 2 and divides the light beam into a first reflected light and a first transmitted light. The first reflector 16 receives the first transmitted light and reflects it to the third reflector 18. The third reflector 18 reflects the first transmitted light to the third beam splitter 3b. The second reflector 17 receives the first reflected light and reflects it to the second beam splitter 3a. The optical path of the first reflected light after passing through the second beam splitter 3a is similar to that of FIG. 1. The first transmitted light is divided by the second beam splitter 3a into two beams with equal intensity, one of which passes in turn through the first attenuator 4a, the first holophote 5a, the filter 6, the small-aperture diaphragm 7, the photodetector 8, and finally is used as reference light; the other of which is divided into two beams 11a, 13 through the first small angle splitting prism 9a. Two ground scattered light beams returned along the original direction of the two beams 11b, 12 are used as signal light, which in turn passes through the filter 6, small hole diaphragm 7, photodetector 8. The signal light and the reference light are finally converted into Doppler signals (i.e., a first set of Doppler signals) by the photodetector 8. The signal processing unit 10 may receive the first set of Doppler signals. The first reflected light is divided by the third beam splitter 3b into two beams with equal intensity, one of which passes in turn through the second attenuator 4b, the second holophote 5b, the filter 6, the small-aperture diaphragm 7, the photodetector 8, and finally is used as reference light; the other of which is divided into two beams 12, 13 through the second small-angle splitting prism 9b. Two ground scattered light beams along the original direction of the two beams 12, 13 are together used as the signal light, which is in turn passes through the fourth reflector 14 and fifth reflector 19 to enter the light path the same as the above beam, and then in turn through the filter 6, small aperture diaphragm 7, photodetector 8. The signal light and the reference light are finally converted into Doppler signals (i.e., a second set of Doppler signals) by the photodetector 8. The signal processing unit 10 may receive the second set of Doppler signals. Thus, the signal processing unit 10 receives two sets of Doppler signals.

In some embodiments, at least two sets of Doppler signals can be simultaneously measured and the corresponding at least two velocities (e.g., the velocities of the left and right sides of the vehicle relative to driving surface) can be calculated based on the two sets of Doppler signals. The calculation method can be referred to the description of some other embodiments of this disclosure (See, e.g., FIG. 2 and method for determining the left and right side velocities of a carrier below). The signal processing unit 10 may obtain the Doppler signals detected by the photodetector 8 and determine the Doppler frequencies corresponding to the emergent beams 11a and 11b and the Doppler frequencies corresponding to the emergent beams 12 and 13, respectively. According to equation (1), the velocities corresponding to the two sets of emergent beams, for example, the velocity corresponding to the left side of vehicle and the velocity corresponding to the right side of vehicle, may be determined.

In some embodiments, by setting two reflectors to adjust the optical paths of the first reflected light and the first transmitted light to the same optical path, the detection of multiple Doppler signals may be performed on one photodetector, saving equipment cost and simplifying the optical path, and making the velocities of both sides of carrier (e.g., the driving velocities of the left and right sides of a vehicle during driving) accurately measured. Based on the velocities on both sides of the carrier, the angular velocity, steering angle and lateral deflection of the carrier during cornering can be determined.

The present disclosure provides a method for velocity detection. The method may include: generating two second detection beams with a first angle based on a first detection beam passing through a small-angle splitting prism; and converting Doppler signals into Doppler frequencies to determine a velocity of a carrier. The Doppler signals are generated based on the reflected light of second detection beams.

The first detection beam is the initial light for velocity detection. In some embodiments, the first detection beam may be a laser, natural light, or the like. In some embodiments, the first detection beam may be light split by a beam splitting device (e.g., a beam splitter), such as light split by the beam splitter 3 shown in FIG. 1, and light split by the beam splitters 3a and 3b shown in FIGS. 4 and 5. In some embodiments, the first detection beam may also be light emitted by other devices, including, but not limited to, light emitting devices, e.g., lasers, or the like.

A small-angle splitting prism is a component that splits a light beam into two beams with a small angle. In some embodiments, a small angle is an angle of less than 60 degrees. In some embodiments, a small angle is an angle of less than 15 degrees. In some embodiments, the small-angle splitting prism may be a coated prism. In some embodiments, the small-angle splitting prism may split the first detection light into at least two second detection beams, wherein there is an angle between the at least two second detection beams. In some embodiments, the small-angle splitting prism is formed by gluing two prisms together. As shown in FIG. 1, the small-angle splitting prism 9 may be a rectangular shape that splits the first detection light into the second detection light 11 and 12. In some embodiments, the glued surfaces between the two prisms of the small angle splitting prism are coated with a transmissivity to reflectivity ratio of 1:1. In some embodiments, both the incident surface and the emergent surface of the small-angle splitting prism are coated with transmission-enhancing films.

In some embodiments, the second detection beams may be two beams generated after the first detection light has been split by a small-angle splitting prism. In some embodiments, the two second detection beams have a first angle. In some embodiments, the second detection beams may be directed at a moving object with relative motion such as ground. In some embodiments, the second detection beams may include the emergent beams 11 and 12 as shown in FIG. 1, the emergent beams 11a and 11b, 12a and 12b as shown in FIGS. 4 and 5, the emergent beams 11a, 11b, and 12, 13 as shown in FIGS. 6 and 7. In some embodiments, the second detection beams may include the reflected light originating from any two beams emitting to the ground and has an angle. In some embodiments, the second detection beams may include ground scattered light from any two beams emitting to the ground and with an angle.

Based on the Doppler signals generated by the reflected light of the second detection beams (e.g., ground scattered light from the second detection beams), the velocity may be determined by the method described in some other embodiments of this disclosure, or by other methods.

In some embodiments, velocity may be determined based on the Doppler signals generated by the reflected light of the second detection beams, as described below:

In some embodiments, a method for determining a velocity based on a Doppler signal may include:

determining an autocorrelation spectrum based on a Doppler signal; searching for a first maximum peak based on an autocorrelation spectrum, and determining a first frequency based on the location of the first maximum peak; searching for a second maximum peak again after filtering the first maximum peak and its nearby spectrum in the autocorrelation spectrum; obtaining the second frequency by calculating the position of the second maximum peak based on the second searching result; and determining velocity based on first frequency, second frequency and first angle.

In some embodiments, an autocorrelation spectrum of a Doppler signal may be obtained by performing an autocorrelation spectrum analysis on the Doppler signal. The autocorrelation spectrum may be a function curve obtained by performing an autocorrelation function calculation on the Doppler signal.

In some embodiments, a maximum peak, i.e., an extreme value point, may be searched for the autocorrelation spectrum as a first maximum peak and recorded. The first frequency may be determined based on the position of this first maximum peak. This first frequency corresponds to one of the second detection beams.

In some embodiments, the maximum peak (i.e., the first maximum peak) and its nearby spectrum may be filtered in the autocorrelation spectrum and the autocorrelation spectrum is updated. A maximum peak, i.e., the extreme value point, is searched for on the updated autocorrelation spectrum as the second maximum peak and recorded.

In some embodiments, the formula for determining the velocity based on the first frequency, the second frequency, and the first angle is as follows:

$$v = \frac{\lambda}{2\sin\alpha}\sqrt{f_{D1}^2 + f_{D2}^2 - 2f_{D1}f_{D2}\cos\alpha}$$

wherein: $\alpha$ denotes first angle, the value of which is determined by the small angle splitting prism; $\lambda$ denotes a preset known coefficient; $f_{D1}$ denotes the first frequency; $f_{D2}$ denotes the second frequency.

The present disclosure also provides a method for velocity detection. The method may include: determining a velocity of a carrier (e.g., a vehicle) based on Doppler signals generated by reflected light from two second detection beams with a first angle. In some embodiments, the two second detection beams with the first angle may be obtained by projecting other laser light, natural light (e.g., first detection beam), or the like, into a small-angle splitting prism. In some embodiments, the two second detection beams with a first angle may be obtained by directly emitting from two lasers. In some embodiments, the two second detection beams with the first angle may be obtained through a beam splitter and a holophote. For example, the beam splitter may split the beam into reflected light and transmitted light with equal intensity, and the reflected light is reflected to the holophote, and the reflected light and transmitted light reflected by the holophote form a first angle. In some embodiments, the second detection beams may include the first emergent beam 11 and second emergent beam 12 as shown in FIG. 3.

In some embodiments, the velocity is determined by Doppler frequencies corresponding to Doppler signals, and the velocity determination process can be found in the method for velocity detection described elsewhere, e.g., FIG. 2 and the process described therein, which will not be repeated herein.

The present disclosure also provides a method for determining the left and right side velocities of a carrier. The method may comprise: determining the left and right side velocities of a carrier based on Doppler signals generated by reflected light from two second detection beams and two fourth detection beams, respectively, wherein the two second detection beams with a first angle is generated from a first detection beam by a small-angle splitting prism, two fourth detection beams with a second angle is generated from a third detection beam by a small-angle splitting prism.

In some embodiments, the first detection beam and the third detection beam may be obtained by passing through a beam splitter based on one light emitter (e.g., a laser). For example, the beam splitter may split the beam into first detection beam and third detection beam with equal intensity. To illustrate, taking FIG. 4 as an example, the first detection beam may be the beam entering into the second reflector 17 after being split by the first beam splitter 15, i.e., the first reflected light.

The second detection beams may be two beams obtained by the first detection beam passing through a first small-angle splitting prism (e.g., the first small angle splitting prism 10a in FIG. 4). For example, the second detection beams may be beams 11a and 12a of FIGS. 4 and 5. For example, the second detection beams may be beams 11a, 13 of FIGS. 6 and 7.

The third detection beam may be another part of the beam split by the beam splitter. To illustrate, taking FIG. 4 as an example, the third detection beam may be the beam obtained after the laser split by the first beam splitting 15 projects into the first reflector 16 and the third reflector 18. For example, the third detection beam may be the first transmitted light in FIG. 4, i.e., the beam incident to the second beam splitter 3a by the third reflector 18 in FIG. 4.

The fourth detection beams may be two beams obtained by the third detection beam passing through a second small-angle splitting prism (e.g., second small-angle splitting prism 10b). For example, the fourth detection beams may be beams 11b and 12b in FIGS. 4 and 5. For example, the fourth detection beams may be beams 11b and 12 in FIGS. 6 and 7.

In some embodiments, determining the left and right side velocities based on the Doppler signals generated from the reflected light of the second detection beams and the fourth detection beams may include:

obtaining the corresponding Doppler signals based on the second detection light and the fourth detection light. Then, after the process described in FIG. 2, the velocity on the left side of the carrier and the velocity on the right side of the carrier (i.e., the left and right side velocities of the carrier) may be calculated.

In some embodiments, determining the left and right velocities based on the Doppler signals generated by the reflected light from the second detection beams and the fourth detection beams may include:

interrupting the detection beam at one side (e.g., left side or right side) to determine the frequency restored corresponding to the detection light at the other side; and restoring the detection beam at the one side, so that the four frequencies corresponding to the detection light on both sides may be determined. In some embodiments, the interrupting action may be performed before or after the first or third detection beam split by the small angle splitting prism. For example, the second detection beams can be interrupted first, the frequency corresponding to the fourth detection beams may be determined and the second detection beams are restored to determine the frequencies corresponding to the detection beams on both sides. For example, the first detection beam can be interrupted first, the frequencies corresponding to the fourth detection beams may be determined, the first detection beam may be restored to determine the frequencies corresponding to the detection beams on both sides. In some embodiments, the interrupting action may include placing a light shielding device, for example, a light baffle.

In some embodiments, the four frequencies corresponding to the detection beams on two sides may be determined based on frequency continuity. For example, assuming that the frequency of beam 1 at moment t is f1 and the frequency of beam 2 is f2, and the difference between f1 and f2 is sufficiently large. At moment t+1 (the interval between moment t+1 and moment t is short enough), the frequency f3 is measured, and if the difference between the frequency f3 and the frequency f1 is small enough, it can be assumed that the frequency f3 corresponds to beam 1. This is due to the fact that f3 can only be obtained from the f1 in a sufficiently short period of time because of the continuity of the frequency variation and the limited variation of the vehicle velocity. Thus, the correspondence between the detection beams on both sides and frequencies may be determined. Once the correspondence is determined, it is possible to continuously determine the correspondence based on frequency continuity, thus determining the four frequencies corresponding to the detection beams on both sides (e.g., the second detection beams, the fourth detection beams).

In some embodiments, the difference in an inclination angle between the second detection beams and the difference in an inclination angle between the fourth detection beams are greater than a threshold value. The difference in an inclination angle is the difference in an angle of the two second detection beams or the two fourth detection beams relative to the ground. For example, as shown in FIG. 4, the difference in the inclination angle of one of the second detection beams 11a to the ground may be 75 degrees, the difference in the inclination angle of the other of the second detection beams 11b to the ground may be 30 degrees, the difference in the inclination angle between the second detection beams is 45 degrees, and the threshold value may be 40 degrees.

When the difference in the inclination angle is large enough, the effect of the inclination angle on the frequency is much greater than the effect of the difference of the left and right side velocities on the frequency, thus making the two sets of frequencies significantly different and avoiding confusion.

Based on the two frequencies corresponding to the second detection beams and based on the two frequencies corresponding to the fourth detection beams, the left side velocity and the right side velocity are calculated based on the calculation method described in FIG. 2 and its related description, respectively. Based on the left and right side velocities, the difference between the left and right sides can be further obtained. Thus, the lateral offset of the carrier rotation, the angular velocity of the carrier rotation, or the like, may be further determined based on the difference between the left and right sides.

Based on the above method, the left side and right side velocity of the carrier may be determined on the basis of determining the velocity of the carrier such as a vehicle, thereby further calculating the lateral offset of the carrier and the angular velocity of cornering when the carrier is turning, which is conducive to better understanding of the trajectory of the carrier; in addition, the above method can reduce the influence of both sides of the detection beams on the measurement results on the other side when measuring the velocity corresponding to detection beams at one side.

The present disclosure also provides a reference beam laser Doppler velocimetry (LDV) probe (also referred to as probe in short). In some embodiments, the probe is equipped with a small-angle splitting prism on the laser path incident on driving surface. In some embodiments, the small-angle splitting prism is glued together by two prisms. In some embodiments, the small-angle splitting prism is coated with a transmissivity to reflectivity ratio of 1:1 on the glued surface between the two prisms. In some embodiments, the incident and emergent surfaces of the small angle splitting prisms are coated with a transmission-enhancing film.

In some embodiments, the reference beam type LDV probe includes a laser, a compressed collimating lens group, a beam splitter, an attenuator, a holophote, a filter, a small aperture diaphragm, a photodetector and the small-angle splitting prism. In some embodiments, the reference beam type LDV probe may include the reference beam type LDV probe as shown in FIG. 1 and description thereof. In some embodiments, the laser beam emitted from the laser is compressed and collimated by the compressed collimating lens group and then incident to the beam splitter, and is split into two beams with equal intensity, one of which is reflected through the attenuator to the holophote and then reflected to the attenuator again for attenuation and then is received as reference light by the photodetector after passing through the beam splitter, filter and small aperture diaphragm; the other of which is divided by the small-angle splitting prism into two beams with angle α incident to the driving surface, and the two beams are the first emergent beam and the second emergent beam respectively. Two ground scattered light returned along the original direction of the two emergent beams are together as signal light, the signal light including the scattered light returning along the original direction of the first emergent beam and the scattered light returning along the original direction of the second emergent beam. The signal light is received by the photodetector after passing through the small-angle splitting prism, beam splitter, filter, and small aperture diaphragm. Frequencies of the reference light and the signal light are mixed on the photosensitive surface of the photodetector, and the photodetector collects the mixed frequencies of the reference light and the signal light to form Doppler signals.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A vehicle-mounted dual-oblique asymmetric laser velocity measurement device which is mounted on a carrier and moves with the carrier to determine a velocity of the carrier relative to a driving surface, comprising:
    a reference-beam laser Doppler velocimetry (LDV) probe and a signal processing unit, wherein
    the reference-beam LDV probe makes a laser beam incident onto the driving surface and obtains a scattered light to form a detection signal, the detection signal output from the reference-beam LDV probe is transmitted to the signal processing unit, and the signal processing unit performs velocity calculation, wherein
        a small-angle splitting prism is installed on a laser path where the laser beam of the reference-beam LDV probe is incident onto the driving surface; and
    the reference-beam LDV probe comprises:
    a laser, a compressed collimating lens group, a beam splitter, an attenuator, a holophote, a filter, a small aperture diaphragm, a photodetector, and a small-angle splitting prism, wherein
        a laser beam emitted by the laser is compressed and collimated by the compressed collimating lens group and then incident on the beam splitter;
    the beam splitter divides the laser beam into two laser beams in equal intensity, one of which is incident on the holophote after penetrating through the attenuator, is reflected to the attenuator again for attenuation, passes through the beam splitter, the filter, and the small aperture diaphragm, and is received by the photodetector as reference light, and the other of which is divided by the small-angle splitting prism into two emergent beams with an angle α, which are incident on the driving surface; the two emergent beams are 1# emergent beam and 2# emergent beam, respectively;
    two ground-scattered beams returned along original directions of the two emergent beams are used together as signal light, wherein the signal light comprises the ground-scattered beam returned along the original direction of the 1# emergent beam and the ground-scattered beam returned along the original direction of the 2# emergent beam;
    the signal light passes through the small-angle splitting prism, the beam splitter, the filter, and the small aperture, and is received by the photodetector; and the photodetector obtains Doppler signals formed by mixing frequencies of the reference light and the signal light on a photosensitive surface of the photodetector.

2. The vehicle-mounted dual-oblique asymmetric laser velocity measurement device of claim 1, wherein
    the frequencies of the ground-scattered light returned along the original direction of the 1# emergent beam and the reference light are mixed on the photosensitive surface of the photodetector to form a Doppler signal, and the frequencies of the ground-scattered light returned along the original direction of the 2# emergent beam and the reference light are mixed on the photosensitive surface of the photodetector to form a Doppler signal;
    the Doppler signals detected by the photodetector comprise two different Doppler frequencies;
    the Doppler signals detected by the photodetector are input to the signal processing unit; and
    the signal processing unit performs velocity calculation by extracting the Doppler frequency corresponding to the 1# emergent beam and the Doppler frequency corresponding to the 2# emergent beam.

3. The vehicle-mounted dual-oblique asymmetric laser velocity measurement device of claim 2, wherein
    the Doppler frequency corresponding to the 1# emergent beam and the Doppler frequency corresponding to the 2# emergent beam are represented by the following Equations:

$$f_{D1} = \frac{2v\cos\theta}{\lambda}$$

$$f_{D2} = \frac{2v\cos(\theta + \alpha)}{\lambda}$$

wherein α denotes an angle between the 1# emergent beam and the 2# emergent beam and the size of the angle is determined by the small-angle splitting prism; θ denotes an emergent inclination angle of the 1# emergent beam; (θ+α) denotes an emergent inclination angle of the 2# emergent beam; $f_{D1}$ denotes the Doppler frequency corresponding to the 1# emergent beam; and $f_{D2}$ denotes the Doppler frequency corresponding to the 2# emergent beam; and based on the above Equations, the following Equation is determined:

$$v = \frac{\lambda}{2\sin\alpha}\sqrt{f_{D1}^2 + f_{D2}^2 - 2f_{D1}f_{D2}\cos\alpha}$$

$$\theta = \arctan\frac{f_{D1}\cos\alpha - f_{D2}}{f_{D1}\sin\alpha}$$

the signal processing unit performs the velocity calculation including:
    calculating the velocity v of the vehicle in conjunction with the angle α between the 1# emergent beam and the 2# emergent beam by detecting the Doppler frequency corresponding to the 1# emergent beam and the Doppler frequency corresponding to the 2# emergent beam.

4. The vehicle-mounted dual-oblique asymmetric laser velocity measurement device of claim 2, wherein after the Doppler signals detected by the photodetector are input to the signal processing unit,
    an autocorrelation spectrum of the Doppler signal is first obtained by autocorrelation spectrum analysis, a maximum peak is searched, a first Doppler frequency is obtained based on a position of the maximum peak;

the maximum peak and neighboring spectrum are filtered out from the autocorrelation spectrum and a maximum peak is searched from the filtered autocorrelation spectrum, a second Doppler frequency is obtained based on a position of the maximum peak searched again; and acceleration discrimination is performed based on the two Doppler frequencies to determine a correspondence relationship between the two Doppler frequencies and the two emergent beams and to obtain the Doppler frequency corresponding to the 1# emergent beam and the Doppler frequency corresponding to the 2# emergent beam.

5. The vehicle-mounted dual-oblique asymmetric laser velocity measurement device of claim 1, wherein the small-angle splitting prism comprises two prisms glued together.

6. The vehicle-mounted dual-oblique asymmetric laser velocity measurement device of claim 5, wherein glued surfaces between the two prisms of the small-angle splitting prism are coated with a splitting film having a transmissivity to reflectivity ratio of 1:1, and the small-angle splitting prisms are coated with a transmittance-enhancing film on both incident and emergent surfaces.

7. A reference-beam laser Doppler velocimeter (LDV) probe which is mounted on a carrier and moves with the carrier, wherein a small-angle splitting prism is installed on a laser path where the laser beam of the reference-beam LDV probe is incident onto the driving surface, and the reference-beam LDV probe comprises:

a laser, a compressed collimating lens group, a beam splitter, an attenuator, a holophote, a filter, a small aperture diaphragm, a photodetector, and a small-angle splitting prism, wherein a laser beam emitted by the laser is compressed and collimated by the compressed collimating lens group and then incident on the beam splitter;

the beam splitter divides the laser beam into two laser beams in equal intensity, one of which is incident on the holophote after penetrating through the attenuator, is reflected to the attenuator again for attenuation, passes through the beam splitter, the filter, and the small aperture diaphragm, and is received by the photodetector as reference light, and the other of which is divided by the small-angle splitting prism into two emergent beams with an angle $\alpha$, which are incident on the driving surface; the two emergent beams are 1# emergent beam and 2# emergent beam, respectively;

two ground-scattered beams returned along original directions of the two emergent beams are used together as signal light, wherein the signal light comprises the ground-scattered beam returned along the original direction of the 1# emergent beam and the ground-scattered beam returned along the original direction of the 2# emergent beam;

the signal light passes through the small-angle splitting prism, the beam splitter, the filter, and the small aperture, and is received by the photodetector; and the photodetector obtains Doppler signals formed by mixing frequencies of the reference light and the signal light on a photosensitive surface of the photodetector.

8. The reference-beam LDV probe of claim 7, wherein the small-angle splitting prism comprises two prisms glued together; glued surfaces between the two prisms of the small-angle splitting prism are coated with a splitting film with a transmissivity to reflectivity ratio of 1:1; and the small-angle splitting prisms are coated with a transmittance-enhancing film on both incident and emergent surfaces.

* * * * *